(12) United States Patent
Bayless

(10) Patent No.: US 6,899,958 B2
(45) Date of Patent: May 31, 2005

(54) MOISTURE BARRIER RESINS

(75) Inventor: Robert G. Bayless, Marietta, GA (US)

(73) Assignee: Encap Technologies, LLC., Atlanta, GA (US)

( * ) Notice: Subject to any disclaimer, the term of this patent is extended or adjusted under 35 U.S.C. 154(b) by 0 days.

(21) Appl. No.: 10/178,179

(22) Filed: Jun. 21, 2002

(65) Prior Publication Data

US 2003/0235690 A1 Dec. 25, 2003

(51) Int. Cl.⁷ ............................................. B32B 27/30
(52) U.S. Cl. ..................................... 428/522; 524/459
(58) Field of Search ............................... 428/522, 913, 428/403; 524/81, 459; 106/285; 525/55, 56

(56) References Cited

U.S. PATENT DOCUMENTS

| | | |
|---|---|---|
| 3,155,590 A | 11/1964 | Miller et al. |
| 3,415,758 A | 12/1968 | Powell et al. |
| 3,565,818 A | 2/1971 | Bayles et al. |
| 3,574,133 A | 4/1971 | Bayless et al. |
| 3,576,660 A | 4/1971 | Bayless et al. |
| 3,629,140 A | 12/1971 | Bayless et al. |
| 3,674,704 A | 7/1972 | Bayless et al. |
| 3,726,803 A | 4/1973 | Bayless et al. |
| 3,748,277 A | 7/1973 | Wagner |
| 3,755,190 A | 8/1973 | Hart et al. |
| 3,816,331 A | 6/1974 | Brown, Jr. et al. |
| 3,922,373 A | 11/1975 | Bayless |
| 3,985,719 A | 10/1976 | Hoyt et al. |
| 4,073,946 A | 2/1978 | Bayless |
| 4,107,071 A | 8/1978 | Bayless |
| 4,152,483 A | 5/1979 | Kanda et al. |
| 4,195,645 A | 4/1980 | Bradley, Jr. et al. |
| 4,377,621 A | 3/1983 | Hart et al. |
| 4,464,434 A | 8/1984 | Davis |
| 4,508,760 A | 4/1985 | Olson et al. |
| 4,990,551 A * | 2/1991 | Haubl et al. .................... 524/30 |
| 5,744,233 A | 4/1998 | Opitz et al. |
| 5,856,009 A | 1/1999 | Nishio et al. |
| 5,908,698 A * | 6/1999 | Budd .......................... 428/403 |
| 5,968,698 A | 10/1999 | Honda |
| 6,064,150 A | 5/2000 | Klinedinst et al. |
| 6,132,822 A * | 10/2000 | Overcash et al. ........... 428/34.2 |
| 6,193,831 B1 * | 2/2001 | Overcash et al. ............ 156/230 |
| 6,562,460 B1 * | 5/2003 | Bayless .................. 428/402.24 |
| 6,573,011 B1 * | 6/2003 | Nair et al. ..................... 430/14 |

OTHER PUBLICATIONS

*Encyclopaedic Dictionary of Physics;* J. Thewlis, Editor–in–Chief; pp. 368–372 (1962).
*IRE Transactions on Electron Device;* vols. 4–6; "Bioliography on Electroluminescence and Related Topics"; Henry F. Ivery; pp. 203–215 (1957–1959).
*Electrochemical Society Journal,* vol. 108; "Bioliography on Electroluminescence and Related Topics, Part II"; Henry F. Ivey; pp. 590–599 (1961).
*Electrochemical Technology;* vols. 1–2; "Bioliography on Electroluminescence and Related Topics", Part III; Henry F. Ivey (1963–1964).
*Electroluminescence;* H.K. Henisch; Pergamon Press (1962).
*Advances in Electronics and Electron Physics;* "Electroluminescence and Related Effects"; Henry F. Ivey; Supplement 1; Academic Press (1963).
U.S. Appl. No. 10/918,357, Bayless, filed Aug. 16, 2004.
U.S. Appl. No. 10/640,576, Bayless, filed Aug. 14, 2003.
U.S. Appl. No. 10/298,419, Bayless, filed Nov. 14, 2002.

* cited by examiner

Primary Examiner—H. Thi Le
(74) Attorney, Agent, or Firm—Foley & Lardner LLP

(57) ABSTRACT

Moisture barrier resins comprising a film-forming, cross-linkable, partially hydrolyzed polymer and a cross-linking agent provide improved impermeability to moisture and extended release capabilities for various particles, substances and other core materials that are encapsulated with compositions which contain these resins.

9 Claims, 2 Drawing Sheets

MOISTURE BARRIER RESINS

TECHNICAL FIELD

The present invention relates to moisture barrier resins. In a more specific aspect, this invention relates to moisture barrier resins which are formed from film-forming, cross-linkable, partially hydrolyzed polymers. This invention also relates to a process for the manufacture of these moisture barrier resins.

The moisture barrier resins of this invention can be used in coating compositions for various encapsulation processes, including microencapsulation and macroencapsulation. These latter two encapsulation processes are generally differentiated by the size of the particles, substances or other core materials that are being encapsulated.

With the above disclosure in mind, this invention will be described with specific reference to the use of these moisture barrier resins in coating compositions for the microencapsulation of phosphor particles. However, this invention will be understood as applicable to the use of these resins in coating compositions for the encapsulation of other particles (such as pharmaceuticals, inorganic solvents, inorganic solids, pigments, dyes, epoxy resins and inorganic salts), for the coating of electronic components (such as printed circuit boards, hybrid circuit boards, high voltage power supplies, wires and cables), for the coating of metal substrates (such as reinforcing bars for concrete, structural steel, automotive parts and ornamental metals) and for the coating of glass and film products (such as motion picture films, glass substrates, prints and slides).

BACKGROUND OF THE INVENTION

Encapsulated particles are known in the prior art. Bayless et al. U.S. Pat. No. 3,674,704 (1972) discloses a process for manufacturing minute capsules, en masse, in a liquid manufacturing vehicle wherein the capsules contain water or aqueous solutions. This patent discloses a specific process for manufacturing minute capsules wherein the capsule wall material is poly (ethylene-vinyl acetate) that is hydrolyzed to a narrowly specified degree (38–50 percent hydrolyzed).

Bayless U.S. Pat. No. 4,107,071 (1978) discloses microcapsules having a capsule core material surrounded by a relatively impermeable, densified protective wall and also discloses a process of manufacturing such microcapsules.

General encapsulating processes which utilize a liquid-liquid phase separation to provide a capsule wall material which envelops the capsule core material to be encapsulated are disclosed in Miller et al. U.S. Pat. No. 3,155,590; Powell et al. U.S. Pat. No. 3,415,758; and Wagner et al. U.S. Pat. No. 3,748,277.

Other prior art references disclose the encapsulation of electroluminescent phosphors; for example, see Budd U.S. Pat. No. 5,968,698 (1999). Additionally, the prior art discloses the coating of luminescent powders with a coating which comprises silicon dioxide; see Opitz et al. U.S. Pat. No. 5,744,233(1998).

Phosphor particles are used in a variety of applications, such as flat panel displays and decorations, cathode ray tubes, fluorescent lighting fixtures, etc. Luminescence or light emission by phosphor particles may be stimulated by applications of heat (thermoluminescence), light (photoluminescence), high energy radiation (e.g., x-rays or e-beams) or electric fields (electroluminescence).

For various reasons, the prior art fails to provide resin coatings having the desired property of impermeability to moisture. Thus, there is a need in the industry for resin coatings having significantly improved properties.

SUMMARY OF THE INVENTION

Briefly described, the present invention provides moisture barrier resins which have an increased resistance to the adverse effects of moisture and which are able to function over an extended period of time (i.e., extended release capabilities). The present invention also provides a process for the manufacture of these resins.

The above-described advantages of the moisture barrier resins of this invention are evident when compared to the resins of the prior art.

As used in this application, the following terms have the indicated definitions:

"Impermeability to moisture"—the ability to prevent or substantially eliminate the intake of moisture and thereby avoid the adverse effects of moisture.

"Improved"—as compared to resins disclosed in the prior art.

As will be seen in greater detail below, the moisture barrier resins of this invention have other characteristics that are either equivalent to, or significantly improved over, the corresponding characteristics of the prior art resins.

Accordingly, an object of this invention is to provide moisture barrier resins.

Another object of this invention is to provide moisture barrier resins which are formed from film-forming, cross-linkable, partially hydrolyzed polymers.

Another object of this invention is to provide moisture barrier resins having improved impermeability to moisture.

Another object of this invention is to provide moisture barrier resins having extended release capabilities.

Another object of this invention is to provide moisture barrier resins that are useful in coating compositions for encapsulation processes.

Another object of this invention is to provide moisture barrier resins that are useful in coating compositions for microencapsulation and macroencapsulation processes.

Still another object of this invention is to provide a process for the manufacture of moisture barrier resins.

Still another object of this invention is to provide a process for the manufacture of moisture barrier resins from film-forming, cross-linkable, partially hydrolyzed polymers.

Still another object of this invention is to provide a process for the manufacture of moisture barrier resins having improved impermeability to moisture.

Still another object of this invention is to provide a process for the manufacture of moisture barrier resins having extended release capabilities.

Still another object of this invention is to provide a process for the manufacture of moisture barrier resins that are useful in coating compositions for encapsulation processes.

Still another object of this invention is to provide a process for the manufacture of moisture barrier resins that are useful in coating compositions for microencapsulation and macroencapsulation processes.

BRIEF DESCRIPTION OF THE DRAWINGS

FIG. 1 is a chart showing the effect of exposure (measured in hours) on the brightness (measured in foot lamberts) of microencapsulated electroluminescent phosphors and on the brightness of electroluminescent phosphors which have not been microencapsulated.

With reference to FIG. 1, when tested in a humidity cabinet for 1,000 hours, lamps containing phosphors that have been microencapsulated using the moisture barrier resins of this invention showed only 34% degradation, which is 60% less degradation than shown by electroluminescent lamps containing phosphors that have not been microencapsulated using the moisture barrier resins of this invention.

In addition, when electroluminescent lights containing phosphors that have been microencapsulated using the moisture barrier resins of this invention and incandescent lighting were tested as runway lights, the electroluminescent lights produced no halos or glare and could be seen almost 3 times farther away than the incandescent lighting. This same result was observed under artic conditions.

FIG. 2

Figure 1:
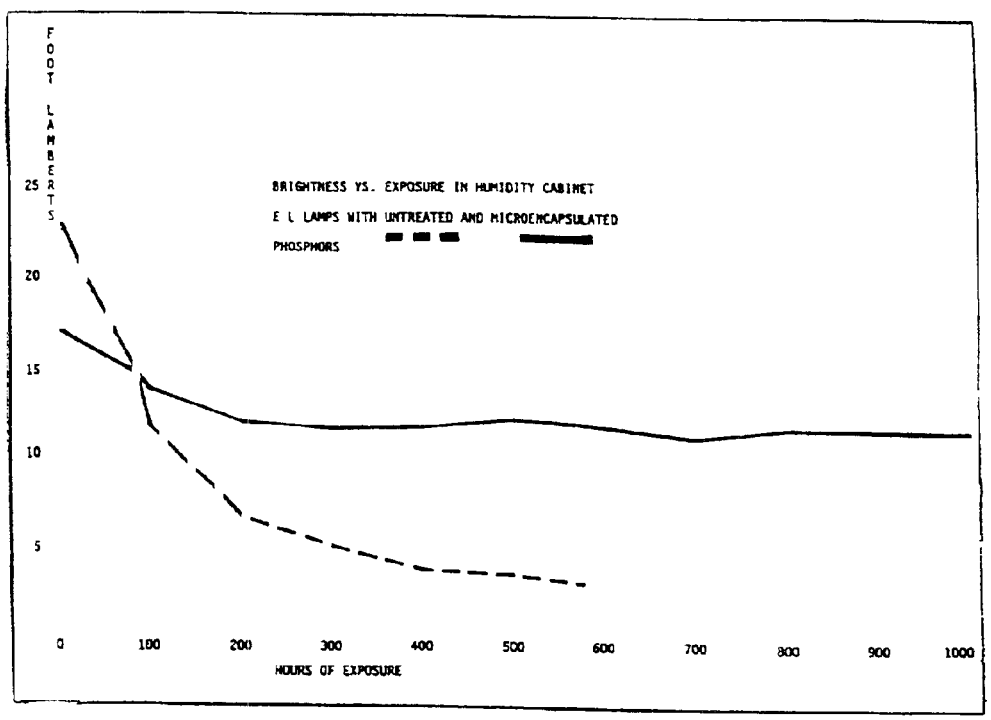
FIG. 1
Figure 2:
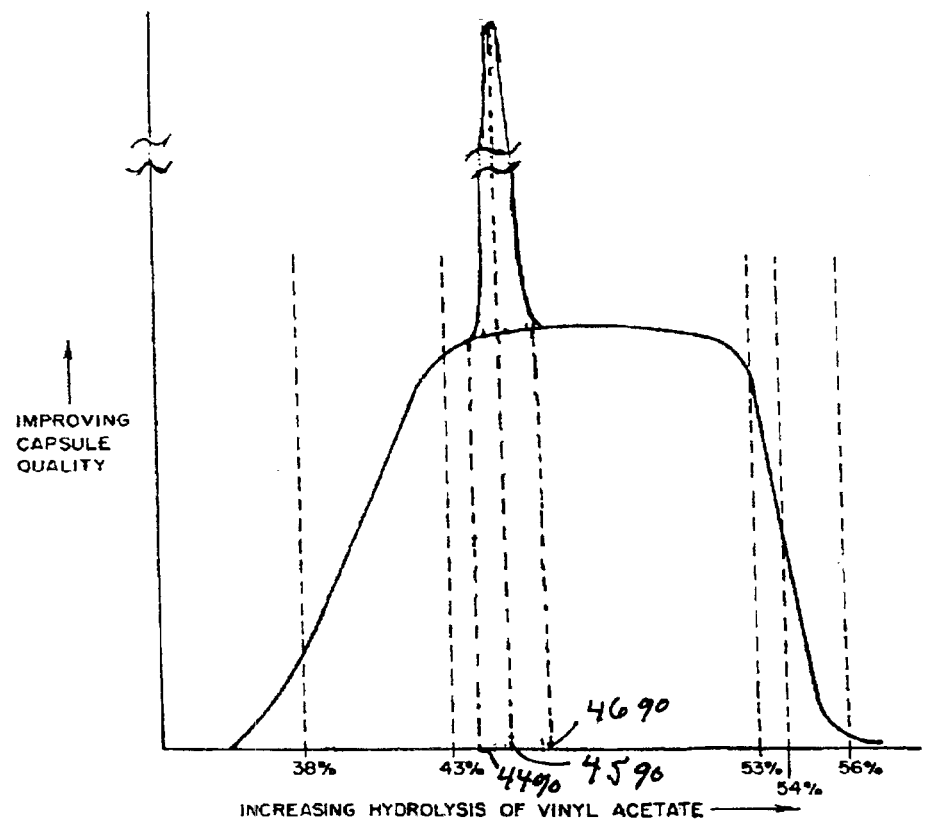

FIG. 2 is a graphical representation of the relation between capsule quality and percent hydrolysis as applied to a partially hydrolyzed poly (ethylene-vinyl acetate). For reasons not entirely understood, the change in quality with change of percent hydrolysis is quite pronounced and remarkable. At a hydrolysis of less than about 38 percent, the separated phase prepared according to established liquid-liquid phase separation techniques is not adequately viscous to form useful capsule walls, and the walls which are formed are sticky and generally unmanageable in attempts to isolate the capsules. Capsules made using materials having less than 38 percent hydrolysis have a tendency to agglomerate during the microencapsulation process, because a lack of vinyl alcohol groups prevents adequate cross-linking across hydroxyl groups.

At hydrolysis of greater than about 55 percent, the separated phase is too viscous and exists as a semi-solid, stringy, precipitous phase. The change from "good" to "no-good" is abrupt and appears to be complete within a few percent.

At hydrolysis between 38 and 43 percent, quality capsules can be prepared with the quality improving as 43 percent hydrolysis is approached.

Between 43 and 53 percent hydrolysis, the capsule quality is excellent for this invention, and the capsules are particularly suited for containing phosphors, polar liquids and other substances for extended periods of time.

From hydrolysis of 53 to 54 or 55 percent, capsule quality declines rapidly, and at a hydrolysis of about 56 percent, quality capsules can no longer be successfully manufactured.

As represented in FIG. 2, at a hydrolysis from about 44 to about 46 percent, the capsule quality is at a maximum for the present invention. The exact capsule quality values for this range of hydrolysis has not been specifically determined but, as represented in FIG. 2, is significantly improved over hydrolysis below this range.

DETAILED DESCRIPTION OF THE INVENTION

The present invention relates to moisture barrier resins which comprise a film-forming, cross-linkable, partially hydrolyzed polymer and a cross-linking agent.

The particles, substances or other core materials that are encapsulated using the moisture barrier resins according to this invention have improved impermeability to moisture as compared to particles, substances or other core materials that are encapsulated with other film-forming polymers according to the prior art.

As stated above, this invention will be described in detail with specific reference to phosphor particles, but the moisture barrier resins of this invention can also be effectively used to encapsulate and/or coat other particles, substances and core materials.

The phosphors which have been microencapsulated using the moisture barrier resins of the present invention comprise a core material formed of a phosphor, typically in particulate form, and a film-like sheath surrounding and enclosing the core. The sheath comprises a partially hydrolyzed, cross-linked polymer (this invention) that is sufficiently impermeable to moisture (especially water) to protect the phosphor from the deteriorating effects of exposure to moisture, but the cross-linked polymer is sufficiently permissive to the transmission of illuminating energy to activate the phosphor to a luminescent state. Thus, these microencapsulates are especially adapted for use in luminescent applications.

In general, the phosphor particles are mixed with the moisture barrier resin of this invention and a liquid vehicle that is a solvent for the resin but not for the phosphor particles. The mixture is agitated to dissolve the resin in the liquid vehicle and to disperse the phosphor particles throughout the solution. A coacervation process is carried out to induce phase separation of the solution to separate the resin from the liquid vehicle and to coat film-like sheaths of the resin on the phosphor particles. The polymer sheaths surrounding the phosphor particles cross-link to harden the resin and render the resin sheaths sufficiently impermeable, thereby protecting the phosphor particles from the deteriorating effects of exposure to moisture. The resin-encapsulated phosphor particles are recovered from solution, washed and dried.

Upon recovery of the phosphor capsules from the process, preferably the resin sheaths are contacted with a halogenated hydrocarbon to cause the resin sheaths to coat the phosphor particles to enhance the water-impermeability of the resin sheaths. Preferred halogenated hydrocarbons are 1,1,2-trichloro-1,2,2-trifluoroethane and dibromotetrafluoroethane.

The Film-Forming, Cross-Linkable, Partially Hydrolyzed Polymer

The polymer should be substantially dielectric, preferably with a dielectric constant less than about 2.2, preferably in the range of from about 1.8 to about 2.2. Various polymers may be utilized to form the protective film-like sheath of the microencapsulates. For certain applications, the polymer should be pyrolyzable.

The polymeric capsule wall material can be any film-forming polymeric material that wets the phosphor core material. The capsule wall material preferably is partially hydrolyzed poly (ethylene-vinyl acetate) containing about 60 to about 88 mol percent ethylene, in which some of the vinyl acetate groups are hydrolyzed to form vinyl alcohol groups that provide reaction sites for subsequent cross-linking. The degree of hydrolysis for the poly (ethylene-vinyl acetate) can be within the relatively broad range of about 38 to about 55 percent, preferably within the range of about 44 to about 46 percent.

Thus, the partially hydrolyzed copolymers of ethylene and vinyl acetate contain ethylene groups, vinyl acetate groups and vinyl alcohol groups, and can be represented by the general formula:

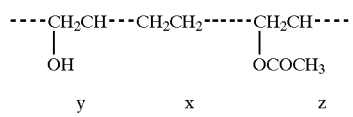

wherein x, y and z represent mol fractions of ethylene, vinyl alcohol and vinyl acetate, respectively. With respect to the degree of hydrolysis, the mol ratio of vinyl alcohol groups to the sum of vinyl alcohol groups and vinyl acetate groups is about 0.15 to about 0.7. The amount of ethylene groups present is also important and can be about 60 to about 88 mol percent. Stated another way, the mol ratio of ethylene groups to the sum of ethylene groups, vinyl alcohol groups and vinyl acetate groups preferably is about 0.6 to about 0.88.

The partially-hydrolyzed poly (ethylene-vinyl acetate) suitable for practicing the present invention has a molecular weight of about 50,000 and a melt index (using a 2160 gram force at 190° C., for 10 minutes) of about 5 to about 70, preferably a melt index of about 35 to about 45. The molecular weight of the polymer is not overly critical, except that if the molecular weight is too high, the polymer will be relatively insoluble in the liquid vehicle that optionally forms a major portion of the microencapsulation system. If the molecular weight of the polymer is too low, phase separation may be difficult to induce during microencapsulation. Other suitable polymeric wall materials are the poly (vinyl-formal) polymers, poly (vinyl-butyral) polymers, alkylated cellulose (e.g., ethyl cellulose), acylated cellulose (e.g., cellulose acetate butyrate) and like materials.

The preferred polymer of this invention is poly (ethylene-vinyl acetate) having a melt index of about 35 to about 37 and having about 44 to about 46 percent of the vinyl acetate groups hydrolyzed to vinyl alcohol groups. This polymer has an ethylene content of about 70 percent, a vinyl alcohol content of about 10 to about 14 percent (most preferably about 12.5 to about 13 percent) and a vinyl acetate content of about 16 to about 20 percent (most preferably about 17 to about 18 percent).

In the (ethylene-vinyl acetate) polymer of this invention, the melt index will be too high or too low if the ethylene content is too high or too low, respectively. In addition, these polymers become too hydroscopic if the vinyl alcohol content is too high. Further, the polymer properties decrease if the vinyl acetate content is too high.

Use of a Solvent

While not essential to this invention, the moisture barrier resins may optionally be a solvent-based mixture. In general, the desired thickness of the coating will determine whether a solvent is beneficial, with the thinner coatings being prepared from a solvent-based mixture of the resin and cross-linking agent. Preferably, the solvent used is an organic nonpolar solvent.

Typical illustrative water-immiscible liquids which can serve as liquid vehicles for the moisture barrier resins are solvents for the polymeric wall material and include the liquid aromatic hydrocarbons such as toluene, xylene, benzene, chlorobenzene and the like; and the liquid halogenated hydrocarbons such as trichloroethylene, tetrachloroethylene, carbon tetrachloride, methyl chloride and the like. Also suitable are solvents such as cyclohexanol, methyl isobutyl ketone, 1-methyl-2-pyrrolidone, butanol and the like.

The Substance Particles to be Microencapsulated

A detailed description of phosphor particles which can be microencapsulated (i.e., coated) with the moisture barrier resins of this invention is found in applicant's pending U.S. patent application Ser. No. 09/989,359, filed Nov. 20, 2001 and entitled "Microencapsulated Particles and Process for Manufacturing Same", which disclosure is incorporated into the present application. This pending Ser. No. 09/989,359 also discloses a process for microencapsulating phosphor particles, including phase separation of the solution, and that disclosure is also incorporated into the present application.

Cross-Linking of the Film-Forming, Cross-Linkable, Partially Hydrolyzed Polymer

Suitable cross-linking agents useful for hardening the microcapsules according to the present invention include the diisocyanates or polyisocyanates, e.g., toluene diisocyanate, with or without a catalyst present. Particularly preferred is a toluene diisocyanate-trimethylol propane adduct, usually dissolved in an aliquot of the liquid vehicle. Also suitable as cross-linking agents are the diacid halides such as malonyl chloride, oxalyl chloride, sulfonyl chloride, thionyl chloride and the like; and difunctional hydrides. Another grouping of suitable cross-linking agents is illustrated by the alkali alkoxides such as the sodium, potassium, lithium and cesium methoxides, ethoxides, propoxides and the like.

To effect the desired chemical hardening of the formed sheath, and thereby provide the protective capsule wall, the cross-linking or hardening agent can be dissolved in an aliquot of the liquid vehicle or another compatible solvent and then added to the suspension of sheathed capsule cores. Cross-linking can then be carried out at a temperature of about 0° C. to about 50° C. for a time period of about 5 minutes to about 20 hours, depending on the cross-linking agent that is used. When using the diacid halides, the cross-linking time period can be about 5 to about 15 minutes and, when using the diisocyanates, this time period can be about 5 to about 15 hours, depending on reaction conditions.

The microencapsule sheath can also be hardened or cross-linked by exposing the sheath to high energy ionizing radiation such as accelerated electrons, X-rays, gamma rays, alpha particles, neutrons and the like.

Permeability of the protective wall of the microencapsules is dependent to a considerable extent on the degree of cross-linking that has been effected, and can be built into the protective wall as desired for a given end use by controlling the degree of cross-linking.

For the film-forming, cross-linkable, partially hydrolyzed polymers of this invention, the ratio of polymer: cross-linking agent is about 1:0.2 to about 1:1, preferably about 1:0.3 to about 1:1. I have discovered that as this ratio approaches 1:1, the moisture barrier properties continue to increase but at a slower rate, and the flexibility of the polymer tends to decrease.

Capsules of various sizes can be manufactured using the moisture barrier resin of the present invention, and these sizes can extend from an average diameter of about 1 micron or less to about several thousand microns and more. The usual size for the produced capsules is about 1 micron to about 15,000 microns in average diameter, and preferably is in the range of about 5 microns to about 2,500 microns in average diameter. Similarly, the capsules can be manufactured to contain varying amounts of core material that can constitute up to about 99 percent or more of the total weight of each encapsule. Preferably, the core material constitutes about 50 to about 97 percent of the total weight of each encapsule.

To illustrate the process of this invention, a solution of a liquid vehicle such as toluene and a film-forming polymeric material comprising partially hydrolyzed ethylene-vinyl acetate copolymer (HEVA), having from about 38 percent to about 55 percent, and preferably from about 44 percent to about 46 percent, of the vinyl acetate groups hydrolyzed to form vinyl alcohol groups, is prepared at an elevated dissolution temperature which is suitably above about 70° C., and preferably from about 75° C. to about 100° C. The produced solution is then ready to receive the phosphor core material. Preferably, the solution is allowed to cool to a dispersion temperature of about 30° C. to about 65° C. (The cooling step can be done at room temperature or can be accelerated with cold air, ice, etc.) Phosphor particles having an average diameter in the range of about 5 to about 50 microns are then added to the HEVA-toluene solution with vigorous agitation to disperse the phosphor particles as core material entities throughout the HEVA-toluene solution.

Next, liquid-liquid phase separation of the HEVA copolymer from the toluene solution is induced by adding a phase separating inducer, such as cottonseed oil, and then cooling the resulting mixture to a phase-separation temperature in the range from about 15° C. to about 50° C., preferably from about 20° C. to about 30° C., while continuing the agitation to maintain the dispersed phosphor particles (The cooling step can be done at room temperature or can be accelerated with cold air, ice, etc.). However, the phase separation inducer can also be added earlier, before the phosphor cores. When phase separation is induced within the system, the wall-forming HEVA copolymer material separates out as another discontinuous phase (i.e., a third phase) that preferentially wets the phosphor cores and forms a sheath or capsule wall. This third phase is a relatively concentrated solution or gel of the polymeric material, is more viscous than the continuous phase and in addition, is of sufficiently high viscosity to maintain a substantially continuous sheath around the discrete phosphor cores despite the shearing forces incident to the forces required to maintain these entities in dispersion.

Next, a solution of a cross-linking agent, such as toluene diisocyanate (TDI) adducted with trimethylol propane in toluene, is added to the cooled admixture to cross-link the HEVA sheath which is deposited around the phosphor cores as a result of the addition of the phase-separation inducing cottonseed oil. After TDI adduct addition, the produced mixture is further cooled to a temperature in the range of about 0° C. to about 20° C. and is then permitted to warm to ambient temperature while being continuously agitated. Agitation is continuous until cross-linking is completed. Thereafter, the produced microencapsules are recovered, washed and dried.

Then, if desired, the microcapsules are contacted with a halogenated hydrocarbon, such as by suspending the microcapsules in 1,1,2-trichloro-1,2,2 -trifluroethane. This wash contracts the sheath or wall of the microencapsule and prevents aggregation of the microencapsules. Finally, the microencapsules are dried and preferably treated with a silica gel in the form of micron-size particles to prevent aggregation of the microencapsules.

The present invention is further illustrated by the following examples that are illustrative of certain embodiments designed to teach those of ordinary skill in the art how to practice this invention and to represent the best mode contemplated for carrying out this invention.

EXAMPLE 1

Sixty grams of a partially hydrolyzed ethylene-vinyl acetate copolymer (HEVA, sold under the trademark Japan 8 by Mitsui Corporation) having 44–52 percent of its vinyl acetate groups hydrolyzed to vinyl alcohol groups and having a melt index of 35–37, is added to 2400 ml of toluene in a 4 liter beaker equipped with a 4-inch turbine impeller on a variable speed stirring motor. The HEVA copolymer is dissolved in the toluene by heating the solution to 85° C. and stirring for 15 minutes. Next, the heat is removed, and the temperature is allowed to drop to 58° C. At that time, 900 grams of green phosphor particles, having average diameters in the range of about 10 microns to about 40 microns, are added to the solution of the HEVA copolymer in toluene with vigorous agitation with the stirrer increased to 480 rpm to disperse the phosphor particles substantially uniformly throughout the toluene solution. At about the same time, cottonseed oil is added to the toluene solution (in an amount sufficient to form an 11 percent by weight solution of cottonseed oil) to induce liquid-liquid phase separation. At 42° C., the stirrer is reduced to 430 rpm, and the beaker is placed in an ice bath. The produced mixture is then cooled to about 22° C. while agitated sufficiently to maintain the dispersed phosphor particles in suspension.

A solution of 71.4 grams of a toluene diisocyanate adducted with trimethylol propane in toluene (sold under the trademark Desmodur CB-75N by Mobay Chemicals) is then added to the cooled mixture to cross-link and thus harden the HEVA sheath that is deposited around the core material as a result of the addition of cottonseed oil. After the addition of the diisocyanate adduct, the produced mixture is further cooled to about 10° C. and then is permitted to warm to ambient temperature while continually being agitated. Agitation is continued until cross-linking is completed.

The produced microencapsules are then recovered by filtration, washed with toluene and then suspended in 1250 ml of 1,1,2-trichloro-1,2,2-trifluroethane for five to ten minutes to contract the capsule wall to improve the wall's resistance to water and to prevent aggregation of the microencapsules during filtration and drying. The suspension is repeated three more times, and the microncapsules are then filtered off and washed again with a small amount of 1,1,2-trichloro-1,2,2-trifluroethane. The capsules are next mixed with a finely divided silica gel (sold under the trademark Syloid 74 by W. R. Grace Co.) to aid in preventing aggregation of the microcapsules. The Syloid/microencapsule mixture is passed through a 500 micron sieve and then through a 106 micron sieve, and then spread out on a tray to dry. The yield is about 80 percent.

EXAMPLE 2

The process of Example 1 is successfully repeated using 900 grams of blue phosphor particles having average diameters in the range of about 10 microns to about 40 microns.

EXAMPLE 3

The process of Example 1 is successfully repeated using 600 grams of yellow phosphor particles having average diameters in the range of about 10 microns to about 40 microns.

EXAMPLE 4

The process of Example 1 is successfully repeated using the hydrolyzed ethylene-vinyl acetate polymer, but with 44–46 percent of its vinyl acetate groups hydrolyzed to vinyl alcohol groups.

EXAMPLE 5

The partially hydrolyzed poly (ethylene-vinyl acetate) from Example 4, in a mixture with toluene and a cross-linking agent, is applied to a surface (without an internal phase) and allowed to cure. The resulting protective cross-linked film maintains the moisture barrier properties of the above-mentioned microencapsulated phosphor particles that have an internal phase. This protective cross-linked film can be applied to various size substrates that meet the basic requirements of the encapsulation process.

The cross-linked, partially hydrolyzed poly (ethylene-vinyl acetate) can be painted or overcoated with various coating materials, such as paints.

This invention has been described in detail with particular reference to certain embodiments, but variations and modifications can be made without departing from the spirit and scope of the invention as defined by the following claims.

What is claimed is:

1. A cross-linked film formed from a moisture-barrier resin comprising a mixture of;

(a) a film-forming, cross-linkable, partially hydrolyzed polymer; and
   (b) a cross-linking agent;
   wherein the polymer is hydrolyzed from about 44 to about 46 percent.

2. A moisture-barrier resin according to claim 1, wherein the ratio of polymer to cross-linking agent is about 1:0.2 to about 1:1.

3. A moisture-barrier resin comprising a mixture of:

(a) a film-forming, cross-linkable, partially hydrolyzed polymer; and
   (b) a cross-linking agent;
   wherein the polymer comprises poly (ethylene-vinyl acetate) having a melt index of about 35 to about 37 and having about 44 to about 46 percent of the vinyl acetate groups hydrolyzed to vinyl alcohol groups.

4. A moisture barrier resin according to claim 3, wherein the polymer has an ethylene content of about 60 to about 88 mol percent.

5. A moisture barrier resin according to claim 3, wherein the polymer has a vinyl alcohol content of about 10 to about 14 percent.

6. A moisture-barrier resin according to claim 5, wherein the ratio of polymer to cross-linking agent is about 1:0.3 to about 1:1.

7. A moisture barrier resin according to claim 3, wherein the polymer has a vinyl alcohol content of about 12.5 to about 13 percent.

8. A moisture barrier resin according to claim 3, wherein the polymer has a vinyl acetate content of about 16 to about 20 percent.

9. A moisture barrier resin according to claim 3, wherein the polymer has a vinyl acetate content of about 17 to about 18 percent.

* * * * *